Figure 1:
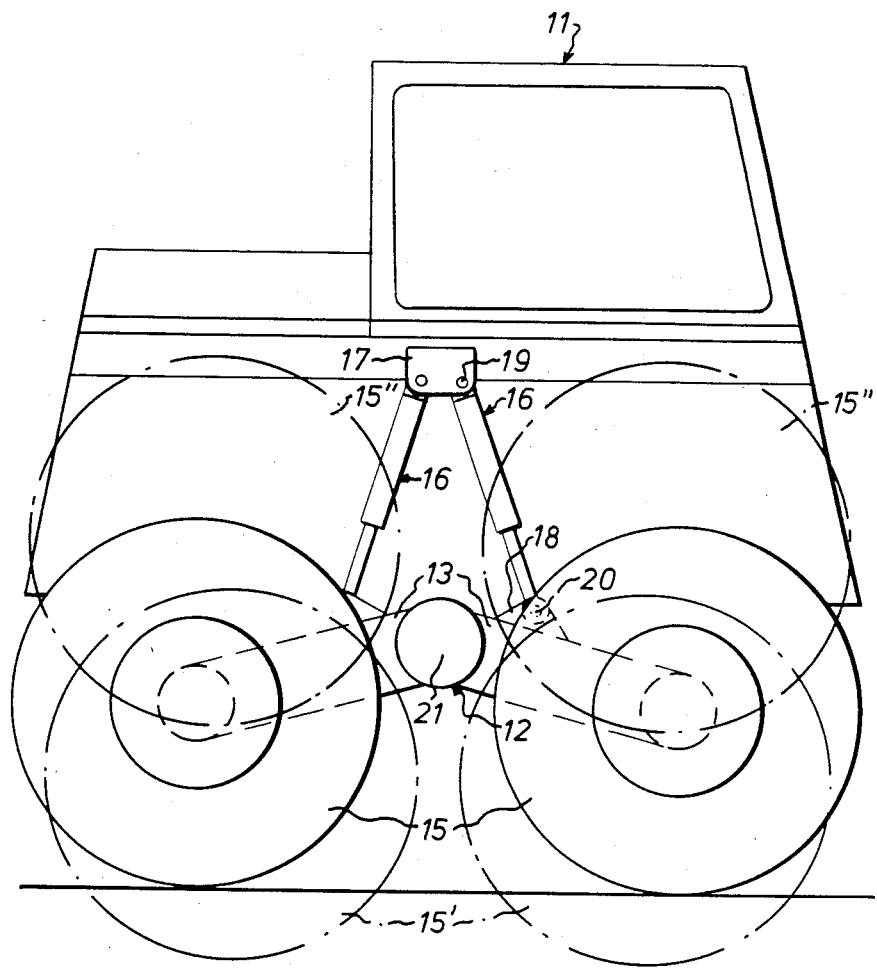

United States Patent [19]

Persson

[11] Patent Number: 4,602,800
[45] Date of Patent: Jul. 29, 1986

[54] TRACTOR

[75] Inventor: Kjell Persson, Sösdala, Sweden

[73] Assignee: Haglinge Industri AB, Sösdala, Sweden

[21] Appl. No.: 690,494

[22] PCT Filed: Apr. 27, 1984

[86] PCT No.: PCT/SE84/00158
§ 371 Date: Dec. 19, 1984
§ 102(e) Date: Dec. 19, 1984

[87] PCT Pub. No.: WO84/04284
PCT Pub. Date: Nov. 8, 1984

[30] Foreign Application Priority Data

Apr. 28, 1984 [SE] Sweden ............................ 8302393

[51] Int. Cl.⁴ .............................................. B06G 17/00
[52] U.S. Cl. .................................. 280/6 H; 180/209; 280/683
[58] Field of Search ................ 180/209, 21; 280/6 R, 280/6 H, 676, 677, 678, 683, 6.1, 43.23

[56] References Cited

U.S. PATENT DOCUMENTS

| | | | |
|---|---|---|---|
| 2,434,693 | 1/1948 | Graham | 180/41 |
| 2,918,292 | 12/1959 | Carmichael | 280/6 R |
| 3,525,534 | 8/1970 | Madler et al. | 280/6 R |
| 3,743,044 | 7/1973 | Scheele | 180/24 |
| 3,918,393 | 12/1959 | Carmichael . | |
| 3,970,327 | 7/1976 | Dezelan | 286/6 H |
| 4,056,158 | 11/1977 | Ross | 180/6.48 |
| 4,090,723 | 5/1978 | Hart | 280/6 H |

FOREIGN PATENT DOCUMENTS

| | | |
|---|---|---|
| 1157931 | 11/1963 | Fed. Rep. of Germany . |
| 2307694 | 11/1976 | France . |
| 168004 | 8/1959 | Sweden . |
| 355463 | 8/1961 | Switzerland . |

Primary Examiner—John A. Pekar
Assistant Examiner—Donn McGiehan
Attorney, Agent, or Firm—Burgess, Ryan & Wayne

[57] ABSTRACT

A tractor having a wheel (15) on the end of each of a pair of pivot arms (13) having a comon central pivot axis (12). A hydraulic cylinder (16) is attached to each arm (13) intermediate the pivot axis (12) and the wheel (15) and to a centrally located bracket (17) on the frame located directly above the pivot axis 12.

3 Claims, 2 Drawing Figures

TRACTOR

The present invention relates to a tractor with a wheel-mounted frame and, connected thereto, a driver's cab.

Many kinds of cross-country vehicles are already known, with wheel-drive or caterpillar-drive. On the whole, they function well but are fairly complicated. It is the object of the present invention to provide a wheel-mounted tractor which is far less sophisticated, but nevertheless has excellent maneuverability and is capable, also when moving over rough ground, of maintaining the driver's cab in a more or less horizontal position. This object is achieved in that the tractor has a transverse, approximately centrally positioned pivot axle which at each end is provided with radial arms pivotally supported independently of each other and carrying a wheel at the arm end facing away from the pivot axle, and in that a hydraulic cylinder is pivotally connected to each arm and the frame at a point above the arm for controlling the pivot position pivotment of the arm relative to the pivot axle.

Figure 2:
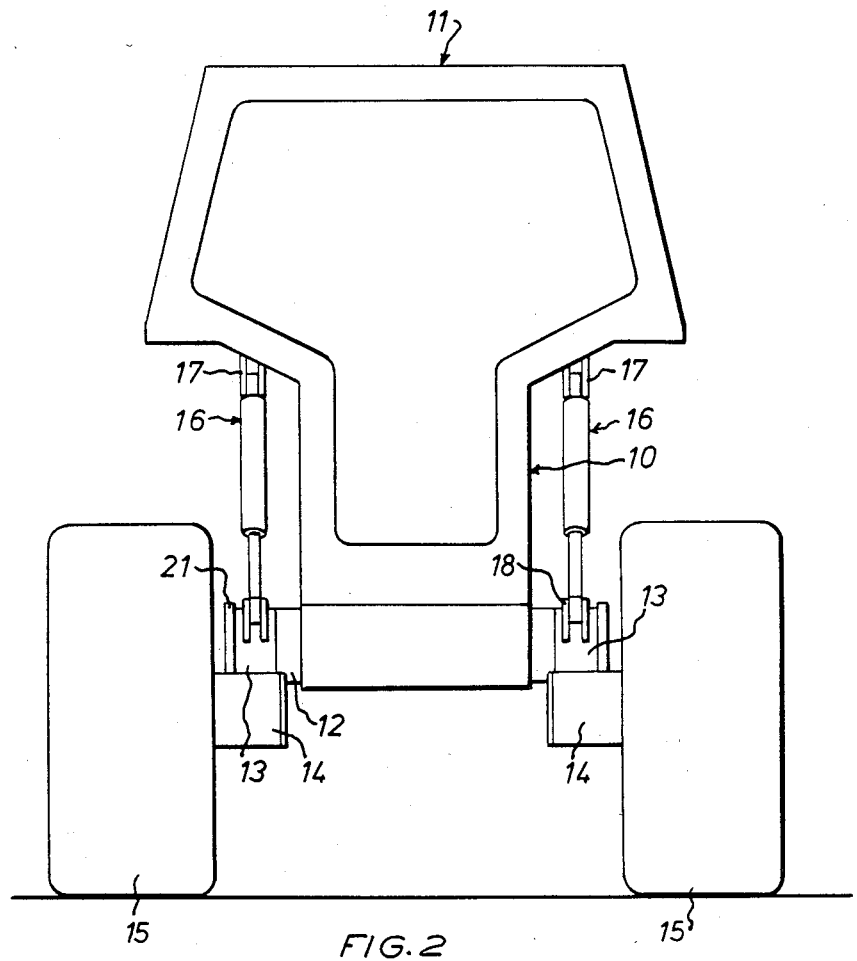

The invention will be described in detail below, reference being had to the accompanying drawings which illustrate an embodiment and in which FIG. 1 is a lateral view of a tractor according to the invention, and FIG. 2 is a rear view of the tractor.

The tractor shown in the drawings has, in conventional manner, a frame 10 and a driver's cab 11 connected thereto. The frame and the driver's cab can have any suitable form and must not necessarily be designed as shown in the drawings. Contrary to other tractors, the tractor according to the invention has only one pivot axle 12 which is hollow and approximately centrally positioned and in some suitable manner (not shown) is connected to the frame 10. The pivot axle 12 projects on either side of the frame 10, as shown in FIG. 2, and on the projecting axle portions, on either side of the tractor, two arms 13 are pivotally supported at one end. The arms 13 are hollow and axially nondisplaceable on the axle 12 in that the arm end portion is disposed in a recess in the axle which at its extreme end has a detachable flange 21. The pivotal arms 13 have, at the end facing away from the axle 12, a journal box 14 extending in parallel with the axle 12. In the box 14 a journal is mounted, carrying a tractor wheel 15. Inside the hollow axle 12, at each end thereof, a hydraulic motor is mounted for driving the tractor wheels 15, each motor being connected to two chain wheels which are positioned opposite the arms 13 on either side of the tractor. Around each chain wheel a chain is placed which extends through the associated hollow arm 13 and at the outer end of the arm is placed around a further chain wheel which is fixedly connected to the wheel journal mounted in the box 14. In this manner, one hydraulic motor drives the wheel pair on one side of the tractor, while the other hydraulic motor drives the wheel pair on the other side of the tractor, and since the motors are driven independently of each other, the tractor can be steered in this manner.

In order to control the pivot position of the arms 13 pivotally mounted on the pivot axle 12, a hydraulic cylinder 16 is provided for each arm 13. The hydraulic cylinders 16 arranged on either side of the tractor are pivotally mounted, at 19, in a bearing bracket 17 rigidly connected to the tractor frame 10 in a position directly above the axle 12. At 20, the piston rods of the hydraulic cylinders are pivotally connected to a bearing bracket 18 positioned on the upper side of each arm 13. When extending or retracting a hydraulic cylinder 16, its associated arm 13 mounted on the pivot axle 12 is pivoted, such that the wheel 15 of the arm can be raised or lowered, as shown by the dash and dot lines at 15' and 15" in FIG. 1. The hydraulic cylinders 16 are operable independently of each other, either manually or by means of a microcomputer system.

During cross-country driving of the tractor according to the invention, each wheel may, as mentioned above, be displaced between the positions designated 15' and 15" independently of the other wheels, and this means that the tractor can be driven over extremely rough and uneven ground, while maintaining the horizontal position of the driver's cab 11. For this purpose, the driver's cab preferably is equipped with a microcomputer sensing the longitudinal and transverse tilting tendency of the driver's cab and activating one or more hydraulic cylinders to eliminate tilting. Since the tractor has but one pivot axle, construction costs are reduced and, furthermore, the maneuverability is improved owing to the increased ground clearance.

I claim:

1. A tractor comprising:
   a wheel mounted frame;
   a driver's cab connected to said frame;
   a transverse, approximately centrally positioned pivot axle secured to said frame;
   radial arms pivotally supported at each end of said axle, independently of each other, each arm having a free end;
   a wheel rotatably carried at the free end of each arm;
   a hydraulic cylinder pivotally connected to each arm and to the frame at a point above the respective arm for controlling the pivotal position of the respective arm relative to the pivot axle; and
   a bearing bracket secured to opposite sides of the frame directly above the pivot axle for pivotally mounting the hydraulic cylinders on both sides of the tractor directly above the pivot axle.

2. A tractor as claimed in claim 1, further including means for maintaining the driver's cab in an approximately horizontal position by individually controlling the pivotal position of the arms through the hydraulic cylinders.

3. A tractor as claimed in claim 1, wherein each said hydraulic cylinder is pivotally connected to each respective arm at a position between opposite ends thereof.

* * * * *

UNITED STATES PATENT AND TRADEMARK OFFICE
CERTIFICATE OF CORRECTION

PATENT NO. : 4,602,800
DATED     : July 29, 1986
INVENTOR(S) : Kjell Persson

It is certified that error appears in the above-identified patent and that said Letters Patent is hereby corrected as shown below:

In the title page in the designation "PCT Filed: April 27, 1984", the correct date should be --April 27, 1983--.

Signed and Sealed this

Seventh Day of April, 1987

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,602,800
DATED     : July 29, 1986
INVENTOR(S) : Kjell Persson

It is certified that error appears in the above-identified patent and that said Letters Patent is hereby corrected as shown below:

On the title page, foreign priority date should read -- April 28, 1983 --.

This certificate supersedes Certificate of

Correction issued April 7, 1987.

Signed and Sealed this

Twenty-fourth Day of November, 1987

Attest:

DONALD J. QUIGG

Attesting Officer

Commissioner of Patents and Trademarks